US 10,461,354 B2

(12) United States Patent
Naito

(10) Patent No.: US 10,461,354 B2
(45) Date of Patent: Oct. 29, 2019

(54) FUEL CELL SYSTEM

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 137 days.

(21) Appl. No.: 15/373,461

(22) Filed: Dec. 9, 2016

(65) Prior Publication Data

US 2017/0170507 A1 Jun. 15, 2017

(30) Foreign Application Priority Data

Dec. 10, 2015 (JP) .................................. 2015-240734

(51) Int. Cl.
| | |
|---|---|
| *H01M 8/2475* | (2016.01) |
| *H01M 8/2485* | (2016.01) |
| *H01M 8/2483* | (2016.01) |
| *B60L 50/72* | (2019.01) |
| *B60L 58/33* | (2019.01) |

(52) U.S. Cl.
CPC .......... *H01M 8/2475* (2013.01); *B60L 50/72* (2019.02); *B60L 58/33* (2019.02); *H01M 8/2483* (2016.02); *H01M 8/2485* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 2005/0014058 A1* | 1/2005 | Dave ................... | H01M 8/0271 429/460 |
| 2011/0104585 A1* | 5/2011 | DiCostanzo ........ | H01M 8/2485 429/508 |
| 2014/0322626 A1* | 10/2014 | Naito .................. | H01M 8/2475 429/467 |

FOREIGN PATENT DOCUMENTS

| | | | |
|---|---|---|---|
| CN | 104124465 | | 10/2014 |
| JP | 2006236611 A | * | 9/2006 |
| JP | 2009-170169 | | 7/2009 |

OTHER PUBLICATIONS

JP2006-236611A, Wakahoi, Machine Translation, Sep. 2006 (Year: 2006).*

(Continued)

*Primary Examiner* — Devina Pillay
(74) *Attorney, Agent, or Firm* — Mori & Ward, LLP

(57) ABSTRACT

A fuel cell system includes a stack case containing a fuel cell stack therein. The stack case includes first and second end plates, first and second side plates, top and bottom cover plates. A top sealing member has a substantially rectangular frame shape and disposed between the top cover plate and each of the first end plate, the second end plate, the first side plate and the second side plate. A bottom sealing member has a substantially rectangular frame shape and disposed between the bottom cover plate and each of the first end plate, the second end plate, the first side plate and the second side plate. At least one of the top sealing member and the bottom sealing member including, at at least one corner of the substantially rectangular frame shape, an extension portion to adjust a peripheral length of the substantially rectangular frame shape.

13 Claims, 7 Drawing Sheets

(56) References Cited

OTHER PUBLICATIONS

Chinese Office Action for corresponding CN Application No. 201611142835.6, Dec. 25, 2018 (w/ English machine translation).

* cited by examiner

FUEL CELL SYSTEM

CROSS-REFERENCE TO RELATED APPLICATIONS

The present application claims priority under 35 U.S.C. § 119 to Japanese Patent Application No. 2015-240734, filed Dec. 10, 2015, entitled "Fuel Cell System." The contents of this application are incorporated herein by reference in their entirety.

BACKGROUND

1. Field

The present disclosure relates to a fuel cell system.

2. Description of the Related Art

For example, a solid polymer fuel cell includes a membrane electrode assembly (MEA), in which an anode electrode is disposed on one surface of an electrolyte membrane (polymer ion-exchange membrane) and a cathode electrode is disposed on the other surface of the electrolyte membrane. The membrane electrode assembly and separators, sandwiching the membrane electrode assembly, constitute a power generation cell. Typically, a predetermined number of such power generation cells are stacked and mounted in a fuel cell vehicle (such as a fuel cell electric automobile) as a vehicle fuel cell stack.

It is desirable that a vehicle fuel cell stack be reduced in size and weight. For example, Japanese Unexamined Patent Application Publication No. 2009-170169 describes a fuel cell developed for this purpose. The fuel cell includes a fuel cell stack and a stack cover that covers the fuel cell stack. At least one end of the fuel cell stack in the stacking direction is supported by an insulating end plate and an opening in the stack cover is sealed by the insulating end plate.

Because the opening in the stack cover is sealed by the insulating end plate, the end plate serves as a part of the stack case and covers the fuel cell stack. It is described that, with such a structure, the outside dimensions of the fuel cell can be reduced and the fuel cell can be reduced in size and weight.

SUMMARY

According to one aspect of the present invention, a fuel cell system includes a fuel cell stack in which a plurality of power generation cells are stacked, each of the power generation cells generating electricity by causing electrochemical reactions between a fuel gas and an oxidant gas; and a stack case in which the fuel cell stack is accommodated.

The stack case includes a pair of end plates that are disposed at both ends of the fuel cell stack in a stacking direction in which the power generation cells are stacked. The stack case further includes a pair of side plates that are disposed along side surfaces of fuel cell stack, an upper plate that is disposed above the fuel cell stack, and a lower plate that is disposed below the fuel cell stack.

According to another aspect of the present invention, a fuel cell system includes a fuel cell stack and a stack case. The fuel cell stack includes power generation cells, first and second ends, first and second sides, and top and bottom sides. The power generation cells are stacked in a stacking direction and configured to generate electricity via electrochemical reactions between a fuel gas and an oxidant gas. The second end is opposite to the first end in the stacking direction. The second side is opposite to the first side in a side direction perpendicular to the stacking direction. The bottom side is opposite to the top side in a height direction perpendicular to the stacking direction and the side direction. The stack case contains the fuel cell stack therein. The stack case includes a first end plate, a second end plate, a first side plate, a second side plate, a top cover plate, a bottom cover plate, a top sealing member, and a bottom sealing member. The first end plate is provided at the first end of the fuel cell stack. The second end plate provided at the second end of the fuel cell stack. The first side plate is provided to be opposite to the first side of the fuel cell stack and connected to the first end plate and the second end plate. The second side plate is provided to be opposite to the second side of the fuel cell stack and connected to the first end plate and the second end plate. The top cover plate provided to be opposite to the top side of the fuel cell stack and connected to the first end plate, the second end plate, the first side plate, and the second side plate. The bottom cover plate is provided to be opposite to the bottom side of the fuel cell stack and connected to the first end plate, the second end plate, the first side plate, and the second side plate. The top sealing member has a substantially rectangular frame shape and disposed between the top cover plate and each of the first end plate, the second end plate, the first side plate and the second side plate. The bottom sealing member has a substantially rectangular frame shape and disposed between the bottom cover plate and each of the first end plate, the second end plate, the first side plate and the second side plate. At least one of the top sealing member and the bottom sealing member including, at at least one corner of the substantially rectangular frame shape, an extension portion to adjust a peripheral length of the substantially rectangular frame shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
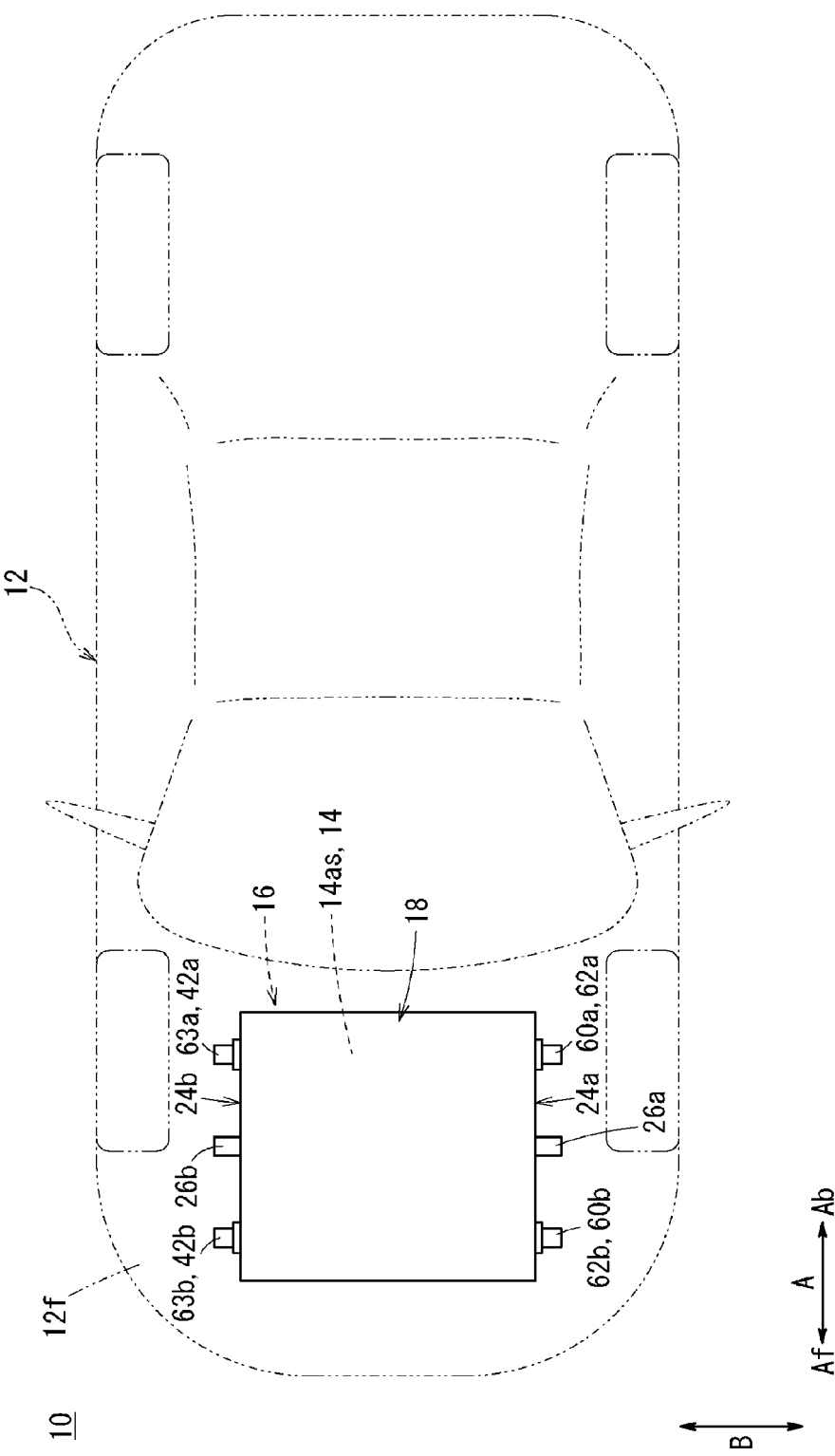
FIG. 1 is a schematic plan view of a fuel cell electric automobile including a fuel cell system according to an embodiment of the present disclosure.

The embodiments will now be described with reference to the accompanying drawings, wherein like reference numerals designate corresponding or identical elements throughout the various drawings.

Referring to FIG. 1, a fuel cell system 10 according to an embodiment of the present disclosure is mounted in a front box 12f (so-called motor compartment) of a fuel cell electric automobile 12 (fuel cell vehicle). Note that the fuel cell system 10 need not be disposed in the front box 12f. For example, the fuel cell system 10 may be disposed under a central part of the floor of the vehicle or near a rear trunk.

Figure 2:
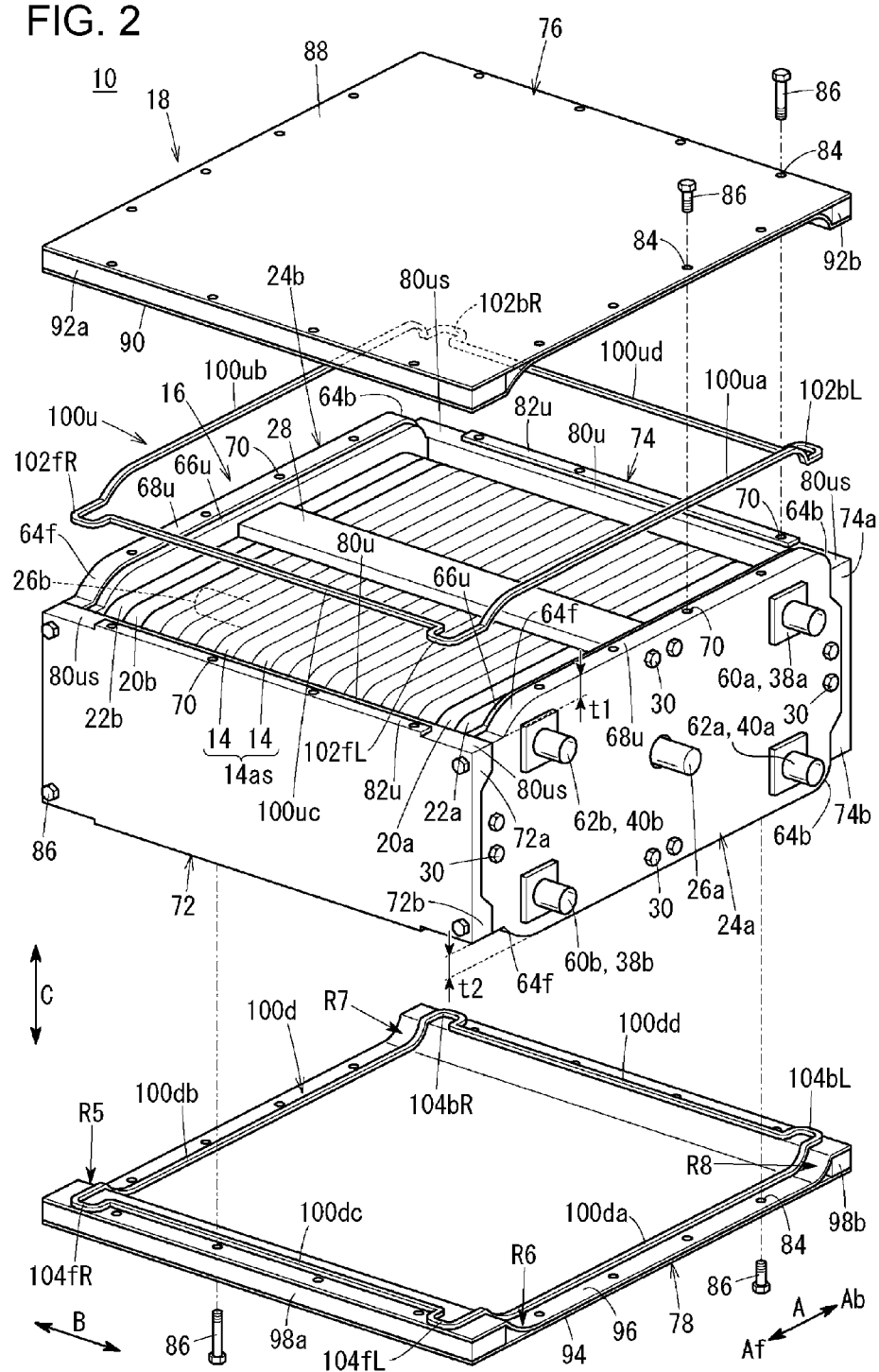
FIG. 2 is a partially exploded perspective view of a stack case of the fuel cell system.
Figure 3:
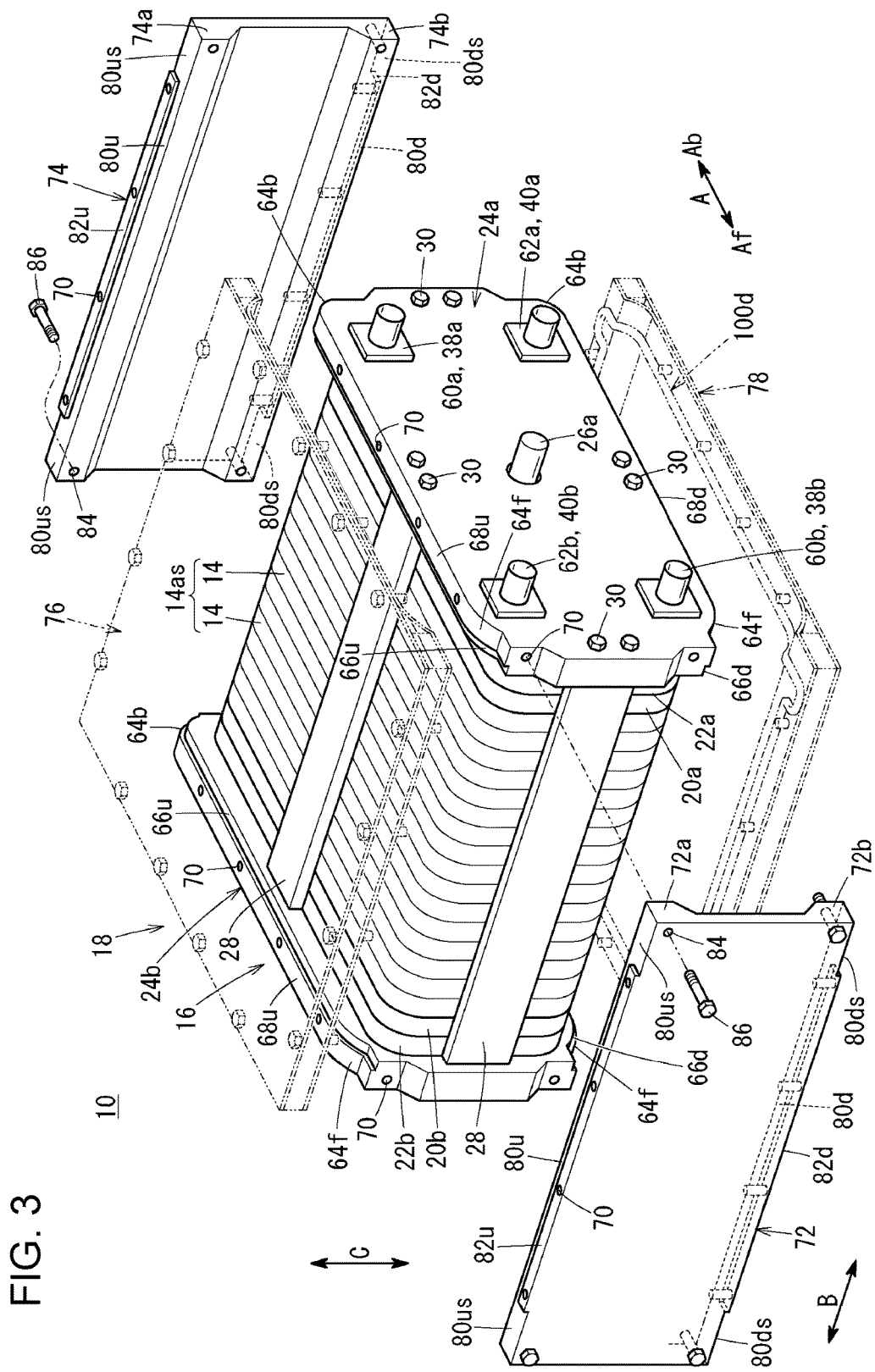
FIG. 3 is a partially exploded perspective view of the stack case of the fuel cell system from which some parts of the stack case are omitted.

The fuel cell system 10 includes a fuel cell stack 16, in which a plurality of power generation cells 14 are stacked, and a stack case 18, in which the fuel cell stack 16 is accommodated (see FIGS. 2 and 3). The power generation cells 14, whose electrode surfaces are in upright positions, are stacked in the vehicle-width direction (direction of arrow B) of the fuel cell electric automobile 12, which crosses the vehicle-length direction (vehicle front-rear direction) (direction of arrow A). The power generation cells 14 may be stacked in the vertical direction (vehicle-height direction) (direction of arrow C).

The power generation cells 14, which are stacked in the direction of arrow B, constitute a stacked body 14as. At one end of the stacked body 14as in the stacking direction, a first terminal plate 20a, a first insulation plate 22a, and a first end plate 24a are arranged outward. At the other end of the stacked body 14as in the stacking direction, a second terminal plate 20b, a second insulation plate 22b, and a second end plate 24b are arranged outward.

The first end plate 24a has a horizontally elongated shape (rectangular shape). A first electric power output terminal 26a, which is connected to the first terminal plate 20a, extends outward from a substantially central part (which may be displaced from the center) of the first end plate 24a. The second end plate 24b has a horizontally elongated shape (rectangular shape). A second electric power output terminal 26b, which is connected to the second terminal plate 20b, extends outward from a substantially central part (which may be displaced from the center) of the second end plate 24b (see FIG. 2).

Connection bars 28, each having a predetermined length, are disposed between edge portions of the first end plate 24a and the second end plate 24b. Each of the connection bars 28 connects substantially central parts of the edge portions of the end plates 24a and 24b. Ends of the connection bars 28 are fixed to the first end plate 24a and the second end plate 24b with screws 30 so as to apply a fastening load to the stack of the power generation cells 14 in the stacking direction (direction of arrow B).

Figure 4:
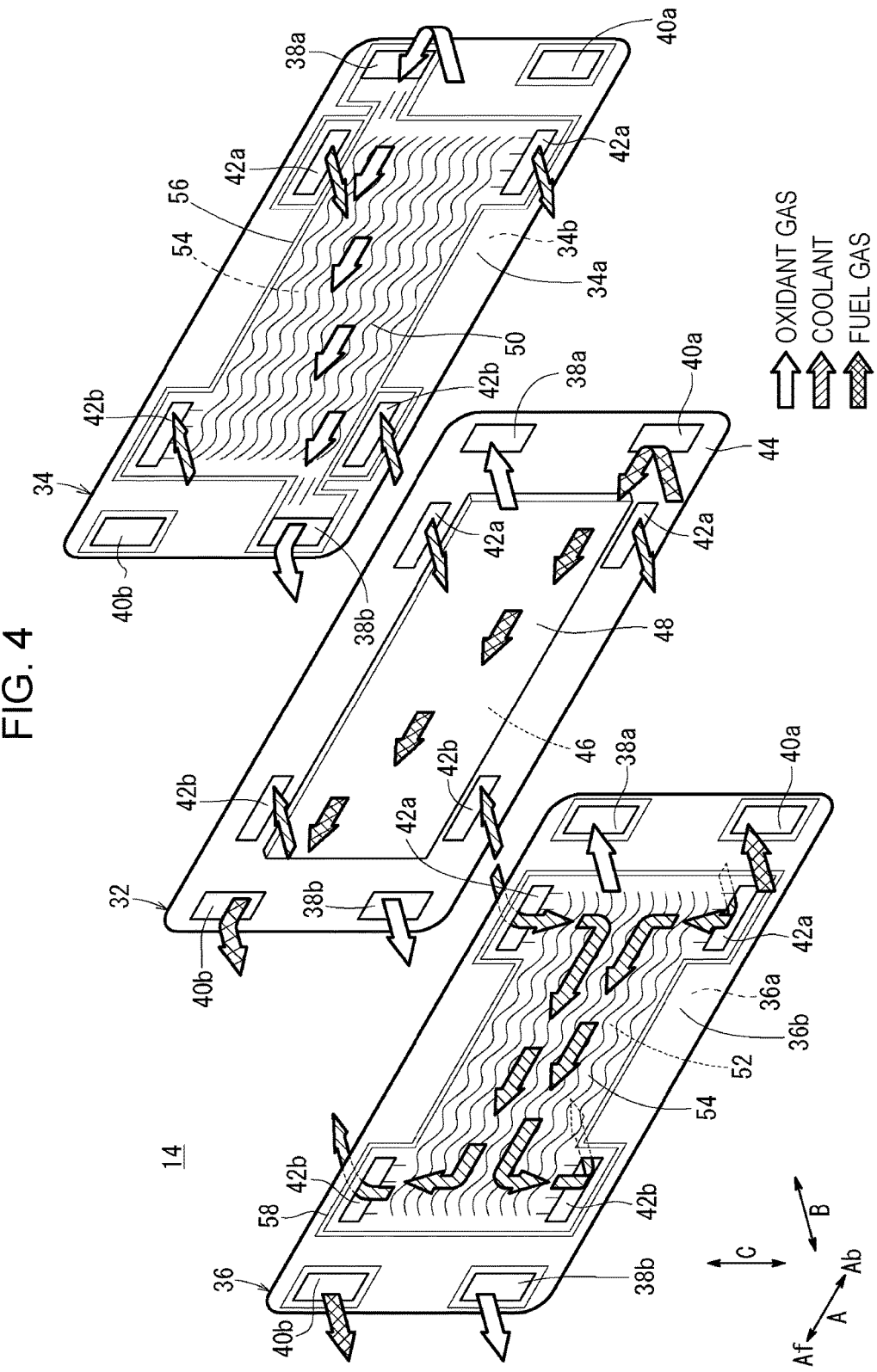
FIG. 4 is an exploded perspective view of a power generation cell included in a fuel cell stack.

Referring to FIG. 4, the power generation cell 14 includes a membrane electrode assembly 32 (MEA), and a cathode separator 34 and an anode separator 36 that sandwich the membrane electrode assembly 32.

Each of the cathode separator 34 and the anode separator 36 is made from, for example, a steel plate, a stainless steel plate, a titanium plate, an aluminum plate, a galvanized steel plate, or any of such metal plates whose surface is anticorrosive coated. Each of the cathode separator 34 and the anode separator 36, which is made by press-forming a thin metal plate, has a rectangular shape in plan view and has an undulating shape in cross-sectional view. Instead of metal separators, for example, carbon separators may be used as the cathode separator 34 and the anode separator 36.

Each of the cathode separator 34 and the anode separator 36 has a horizontally elongated shape having long sides extending in a horizontal direction (direction of arrow A) and short sides extending in direction of gravitation (direction of arrow C).

An oxidant gas supply manifold 38a and a fuel gas supply manifold 40a are formed in one end portion of the power generation cell 14 in the longitudinal direction (the direction of arrow A) so as to extend in the direction of arrow B. An oxidant gas, such as an oxygen-containing gas, is supplied through the oxidant gas supply manifold 38a, A fuel gas, such as a hydrogen-containing gas, is supplied through the fuel gas supply manifold 40a.

A fuel gas discharge manifold 40b and an oxidant gas discharge manifold 38b are formed in the other end portion of the power generation cell 14 in the longitudinal direction so as to extend in the direction of arrow B. The fuel gas is discharged through the fuel gas discharge manifold 40b, The oxidant gas is discharged through the oxidant gas discharge manifold 38b.

A pair of coolant supply manifolds 42a are formed in end portions of the power generation cell 14 in the transversal direction (the direction of arrow C) near the oxidant gas supply manifold 38a and the fuel gas supply manifold 40a (near one end in the horizontal direction). The pair of coolant supply manifolds 42a, through which a coolant is supplied, are formed in opposing upper and lower end portions of the power generation cell 14 so as to extend through the power generation cell 14 in the direction of arrow B.

A pair of coolant discharge manifolds 42b are formed in end portions of the power generation cell 14 in the transversal direction near the fuel gas discharge manifold 40b and the oxidant gas discharge manifold 38b (near the other end in the horizontal direction). The pair of coolant discharge manifolds 42b, through which a coolant is discharged, are formed in opposing upper and lower end portions of the power generation cell 14 so as to extend through the power generation cell 14 in the direction of arrow B.

The membrane electrode assembly 32 includes a solid polymer electrolyte membrane 44, and a cathode electrode 46 and an anode electrode 48 that sandwich the solid polymer electrolyte membrane 44. The solid polymer electrolyte membrane 44 is, for example, a thin film that is made of a perfluorosulfonic acid polymer including water.

The cathode electrode 46 and the anode electrode 48 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed on both sides of the solid polymer electrolyte membrane 44.

An oxidant gas channel 50, through which the oxidant gas supply manifold 38a is connected to the oxidant gas discharge manifold 38b, is formed on a surface 34a of the cathode separator 34 facing the membrane electrode assembly 32. The oxidant gas channel 50 includes a plurality of wave-shaped channel grooves (or linear channel grooves) extending in the direction of arrow A.

A fuel gas channel 52, through which the fuel gas supply manifold 40a is connected to the fuel gas discharge manifold 40b, is formed on a surface 36a of the anode separator 36 facing the membrane electrode assembly 32. The fuel gas channel 52 includes a plurality of wave-shaped channel grooves (or linear channel grooves) extending in the direction of arrow A. The oxidant gas and the fuel gas flow in the same direction through the oxidant gas channel 50 and the fuel gas channel 52, respectively. However, this is not a limitation. The oxidant gas and the fuel gas may flow in opposite directions.

A coolant channel 54, through which the coolant supply manifolds 42a and are connected to the coolant discharge manifolds 42b, is formed between a surface 36b of the anode separator 36 and a surface 34b of the cathode separator 34 of an adjacent power generation cell 14. The coolant channel 54 extends in the horizontal direction and allows the coolant to flow through a region corresponding to the electrodes of the membrane electrode assembly 32.

A first sealing member 56 is integrally formed on the surfaces 34*a* and 34*b* of the cathode separator 34 so as to surround the other periphery of the cathode separator 34. A second sealing member 58 is integrally formed on the surfaces 36*a* and 36*b* of the anode separator 36 so as to surround the other periphery of the anode separator 36.

Each of the first sealing member 56 and the second sealing member 58 is made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIGS. 2 and 3, an oxidant gas inlet manifold member 60*a*, an oxidant gas outlet manifold member 60*b*, a fuel gas inlet manifold member 62*a*, and a fuel gas outlet manifold member 62*b* are attached to the first end plate 24*a*. The oxidant gas inlet manifold member 60*a* and the oxidant gas outlet manifold member 60*b* are respectively connected to the oxidant gas supply manifold 38*a* and the oxidant gas discharge manifold 38*b*. The fuel gas inlet manifold member 62*a* and the fuel gas outlet manifold member 62*b* are respectively connected to the fuel gas supply manifold 40*a* and the fuel gas discharge manifold 40*b*.

Referring to FIG. 1, a coolant inlet manifold member 63*a*, which is connected to the pair of coolant supply manifolds 42*a*, is attached to the second end plate 24*b*. A coolant outlet manifold member 63*b*, which is connected to the pair of coolant discharge manifolds 42*b*, is attached to the second end plate 24*b*.

Referring to FIGS. 2 and 3, curved surfaces 64*f*, each of which is curved inward, are formed at upper and lower corners of a front end portion of the first end plate 24*a* in the vehicle-length direction. Curved surfaces 64*b*, each of which is curved inward, are formed at upper and lower corners of a rear end portion of the first end plate 24*a* in the vehicle-length direction. The curved surfaces 64*f* and the curves surfaces 64*b* have different radii of curvature. However, the curved surfaces 64*f* and 64*b* may have the same radius of curvature.

The first end plate 24*a* includes an upper groove portion 66*u*, which is formed in an inner part (near the stacked body 14*as*) of the upper surface of the first end plate 24*a* so as to extend over the entire length of the upper surface in the direction of arrow A. The first end plate 24*a* includes an upper protruding portion 68*u*, which is formed outside of the upper groove portion 66*u* so as to extend over the entire length of the upper surface in the direction of arrow A. The first end plate 24*a* includes a lower groove portion 66*d*, which is formed in an inner part (near the stacked body 14*as*) of the lower surface of the first end plate 24*a* so as to extend over the entire length of the lower surface in the direction of arrow A. The first end plate 24*a* includes a lower protruding portion 68*d*, which is formed outside of the lower groove portion 66*d* so as to extend over the entire length of the lower surface in the direction of arrow A. A plurality of tapped holes 70 are formed in the outer peripheral surface of the first end plate 24*a*.

The second end plate 24*b* is structured in the same way as the first end plate 24*a*. Elements of the second end plate 24*b* that are the same as those of the first end plate 24*a* will be denoted by the same numerals and detailed descriptions of such elements will be omitted.

The first end plate 24*a* and the second end plate 24*b* form two sides (surfaces) of the stack case 18 at both ends in the vehicle-width direction (direction of arrow B). A front side plate 72 (a first side plate 72) and a rear side plate 74 (a second side plate 74), which have horizontally elongated plate-like shapes, form two sides (surfaces) of the stack case 18 at both ends in the vehicle-length direction (direction of arrow A). An upper plate 76 (a top cover plate 76) and a lower plate 78 (a bottom cover plate 78) form two sides (surfaces) of the stack case 18 at both ends in the vehicle-height direction (direction of arrow C). The upper and lower plates 76 and 78 have horizontally elongated plate-like shapes.

The stack case 18 may further include a pair of end plates that are made of materials different from those of the first end plate 24*a* and the second end plate 24*b*. In this case, the pair of end plates are disposed outside of the first end plate 24*a* and the second end plate 24*b*.

The front side plate 72 and the rear side plate 74 are made by, for example, extrusion, casting, or machining. The front side plate 72 has a horizontally elongated plate-like shape that is disposed in the vertical direction. The front side plate 72 has inner bulges 72*a* and 72*b*, respectively protruding from upper and lower parts of the front side plate 72 toward the inside of the stack case 18.

The front side plate 72 includes an upper groove portion 80*u*, which is formed in an inner part (near the stacked body 14*as*) of the upper surface of the front side plate 72 so as to extend over the entire length of the upper surface in the direction of arrow B. The front side plate 72 includes an upper protruding portion 82*u*, which is formed outside of the upper groove portion 80*u* so as to extend in the direction of arrow B. Wide flat surfaces 80*us* are formed at both ends of the upper groove portion 80*u* in the direction of arrow B. The front side plate 72 includes a lower groove portion 80*d*, which is formed in an inner part (near the stacked body 14*as*) of the lower surface of so as to extend over the entire length of the lower surface in the direction of arrow B. The front side plate 72 includes a lower protruding portion 82*d*, which is formed outside of the lower groove portion 80*d* so as to extend in the direction of arrow B. Wide flat surfaces 80*ds* are formed at both ends of the lower groove portion 80*d* in the direction of arrow B.

A plurality of tapped holes 70 are formed in the upper and lower surfaces of the front side plate 72. An upper hole 84 and a lower hole 84 are formed in each of two end portions, in the direction of arrow B, of a vertical surface of the front side plate 72. Bolts 86 are inserted into the holes 84 and screwed into the tapped holes 70 formed in side surfaces of the first end plate 24*a* and the second end plate 24*b*.

Referring to FIG. 2, the upper surfaces of the first end plate 24*a* and the second end plate 24*b* are located higher than (at a height different from that of) the upper surface of the front side plate 72 by a distance t1. The lower surfaces of the first end plate 24*a* and the second end plate 24*b* are located lower than (at a height different from that of) the lower surface of the front side plate 72 by a distance t2.

Referring to FIG. 3, the rear side plate 74 has a horizontally elongated plate-like shape that is disposed in the vertical direction. The rear side plate 74 includes inner bulges 74*a* and 74*b*, respectively protruding from upper and lower parts of the rear side plate 74 toward the inside of the stack case 18. The rear side plate 74 is structured in the same way as the front side plate 72. Elements of the rear side plate 74 that are the same as those of the front side plate 72 will be denoted by the same numerals and detailed description of such elements will be omitted.

Referring to FIG. 2, the upper plate 76 includes an outer plate 88 and an inner plate 90, which are a pair of pressed plates (press-formed plates) that are joined to each other. Rectangular column members 92*a* and 92*b* are disposed between the outer plate 88 and the inner plate 90 so as to correspond to both end portions (in the direction of arrow A) of the plates 88 and 90, which extend in the stacking direction (direction of arrow B). The width of the rectangular column member 92a in the direction of arrow A is larger than that of the rectangular column member 92b.

Figure 5:
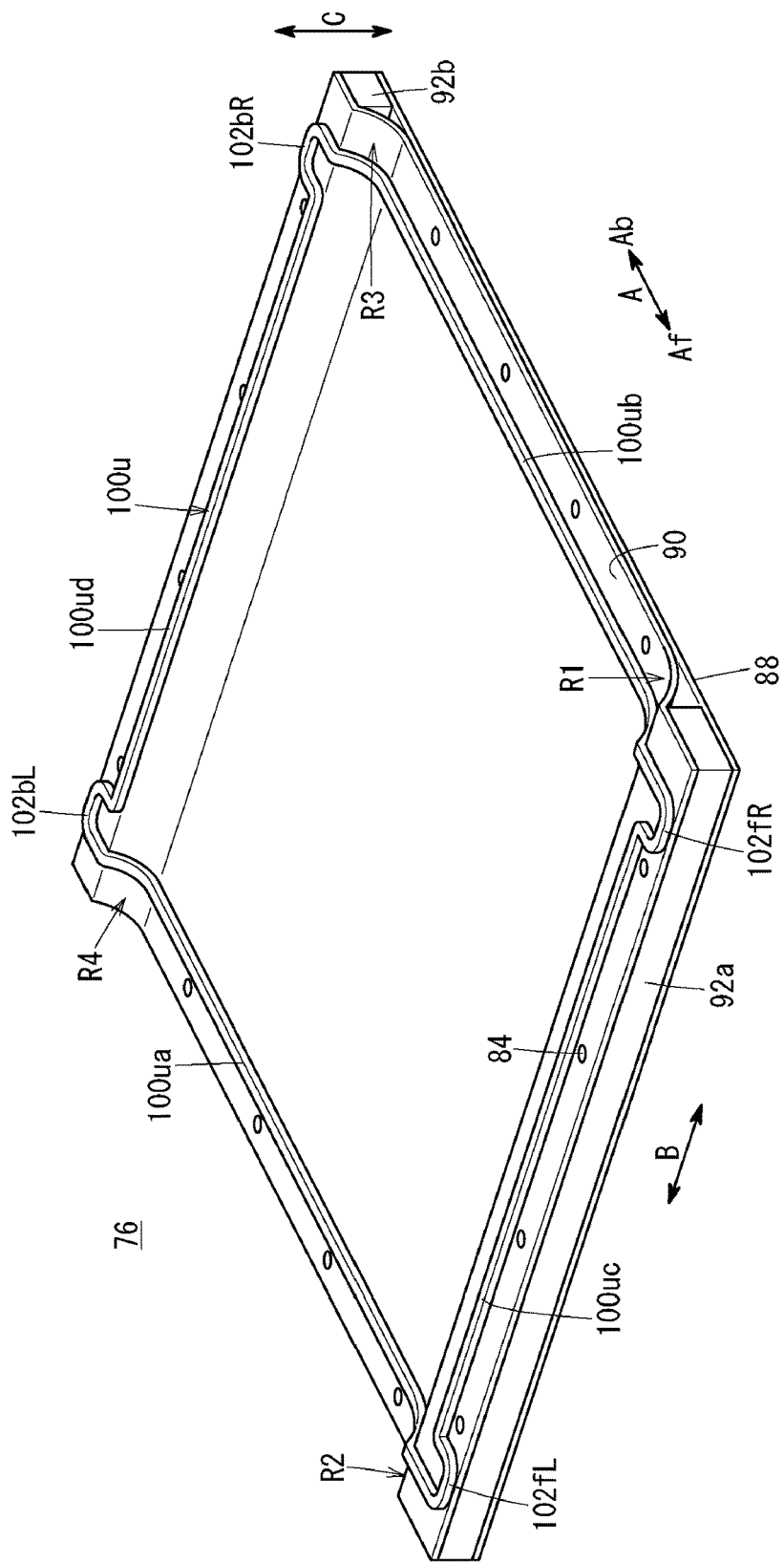
FIG. 5 is a perspective view of an upper plate of the stack case, showing the reverse side.

Referring to FIG. 5, both ends of the inner plate 90 in the direction of arrow A are curved toward the inside of the stack case 18. The inner plate 90 includes left and right rounded portions R1 and R2, which are formed near an end of the inner plate 90 in the direction of arrow Af. The rounded portion R1 and the rounded portion R2 have different arc lengths. The inner plate 90 includes left and right rounded portions R3 and R4, which are formed near an end of the inner plate 90 in the direction of arrow Ab. The rounded portion R3 and the rounded portion R4 have different arc lengths. The arc lengths of the rounded portions R1 to R4 differ from each other. However, the rounded portion R1 and the rounded portion R3 may have the same arc length, and the rounded portion R2 and the rounded portion R4 may have the arc same length.

The inner plate 90 forms an inner peripheral surface of the stack case 18; has a thin-plate like shape; and has a curved shape, a bent shape, or both of curved and bent shapes along the outer shape of the power generation cells 14. The outer plate 88 and the inner plate 90 are fixed to each other by MIG welding, TIG welding, or the like.

Referring to FIG. 2, the lower plate 78 includes an outer plate 94 and an inner plate 96, which are a pair of pressed plates (press-formed plates) that are joined to each other. Rectangular column members 98a and 98b are disposed between the outer plate 94 and the inner plate 96 so as to correspond to both end portions (in the direction of arrow A) of the plates 94 and 96, which extend in the stacking direction (direction of arrow B). The width of the rectangular column member 98a in the direction of arrow A is larger than that of the rectangular column member 98b.

Both ends of the inner plate 96 in the direction of arrow A are curved toward the inside of the stack case 18. The inner plate 96 includes left and right rounded portions R5 and R6, which are formed near an end of the inner plate 96 in the direction of arrow Af. The inner plate 96 includes left and right rounded portions R7 and R8, which are formed near an end of the inner plate 96 in the direction of arrow Ab. The arc lengths of the rounded portions R5 to R8 may differ from each other, or any two of the rounded portions R5 to R8 may have the same arc length.

The inner plate 96 forms an inner peripheral surface of the stack case 18; has a thin-plate like shape; and has a curved shape, a bent shape, or both of curved and bent shapes along the outer shape of the power generation cells 14. The outer plate 94 and the inner plate 96 are fixed to each other by MIG welding, TIG welding, or the like.

A rectangular-loop-shaped upper sealing member 100u (a top sealing member 100u) is disposed between the upper plate 76 and the first and second end plates 24a and 24b and between the upper plate 76 and the front and rear side plates 72 and 74.

Figure 6:
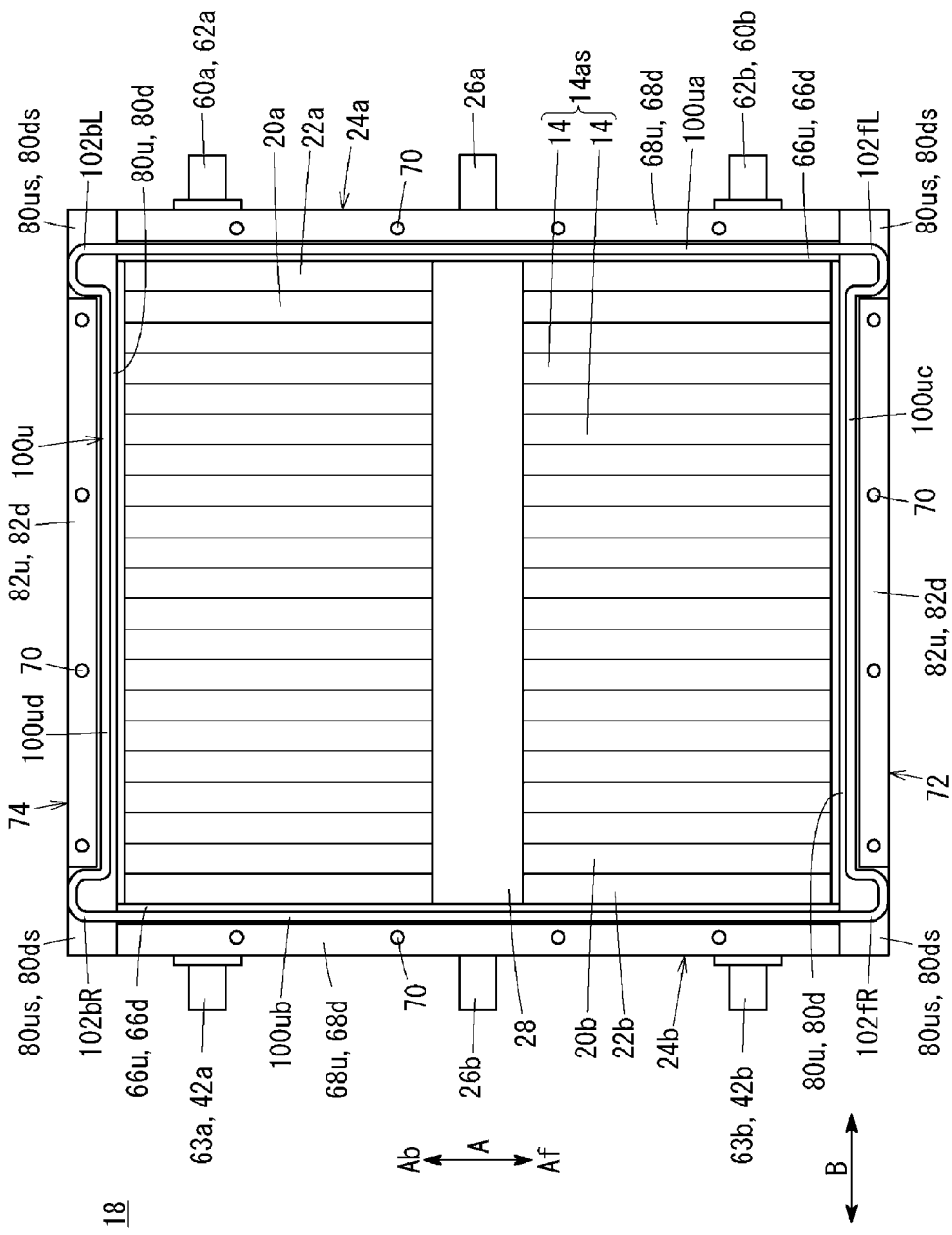
FIG. 6 is a plan view of the stack case.

Referring to FIGS. 2 and 6, the upper sealing member 100u includes two sides 100ua and 100ub, which are respectively disposed in the upper groove portion 66u of the first end plate 24a and the upper groove portion 66u of the second end plate 24b. The upper sealing member 100u includes two sides 100uc and 100ud, which are respectively disposed in the upper groove portion 80u of the front side plate 72 and the upper groove portion 80u of the rear side plate 74. The two sides 100uc and 100ud are located lower than (at a height different from that of) the two sides 100ua and 100ub (see FIG. 2).

The upper sealing member 100u has a quadrangular cross-sectional shape (or a circular cross-sectional shape). The upper sealing member 100u includes extension portions 102fR, 102fL, 102bR, and 102bL for length adjustment, which are disposed at the four corners of the upper sealing member 100u. The extension portions 102fR, 102fL, 102bR, and 102bL have curved shapes that protrude outward at the corners. The extension portions 102fR, 102fL, 102bR, and 102bL have shapes that differ from each other. However, the extension portions 102fR, 102fL, 102bR, and 102bL may have the same shape.

In accordance with the shape of a portion of the stack case 18 to be sealed, the upper sealing member 100u may have at least one of the extension portions 102fR, 102fL, 102bR, and 102bL. For example, only the extension portions 102fR and 102bL may be formed at one pair of opposing corners. Also for a lower sealing member 100d (a bottom sealing member 100d) described below, the positions and the number of extension portions may be changed as appropriate. Only one of the upper sealing member 100u and the lower sealing member 100d may have at least one extension portion.

The extension portions 102fL and 102fR are formed near an end of the upper sealing member 100u in the direction of arrow Af and disposed on the flat surfaces 80us at the ends of the first end plate 24a and the second end plate 24b in the direction of arrow Af. The extension portions 102bL and 102bR are formed near an end of the upper sealing member 100u in the direction of arrow Ab and disposed on the flat surfaces 80us at the ends of the first end plate 24a and the second end plate 24b in the direction of arrow Ab.

Referring to FIG. 2, the lower sealing member 100d, which is rectangular-loop-shaped, is disposed between the lower plate 78 and the first and second end plates 24a and 24b and between the lower plate 78 and the front and rear side plates 72 and 74.

The lower sealing member 100d includes two sides 100da and 100db, which are respectively disposed in the lower groove portion 66d of the first end plate 24a and the lower groove portion 66d of the second end plate 24b. The lower sealing member 100d includes two sides 100dc and 100dd, which are respectively disposed in the lower groove portion 80d of the front side plate 72 and the lower groove portion 80d of the rear side plate 74. The two sides 100dc and 100dd are located higher than (at a height different from that of) the two sides 100da and 100db.

The lower sealing member 100d has a quadrangular cross-sectional shape (or a circular cross-sectional shape). The lower sealing member 100d includes extension portions 104fR, 104fL, 104bR, and 104bL for length adjustment, which are formed at the four corners of the lower sealing member 100d. The extension portions 104fR, 104fL, 104bR, and 104bL have curved shapes that protrude outward at the corners. The extension portions 104fR, 104fL, 104bR, and 104bL have different shapes. However, the extension portions 104fR, 104fL, 104bR, and 104bL may have the same shape.

The extension portions 104fL and 104fR are formed near an end of the lower sealing member 100d in the direction of arrow Af and disposed on the flat surfaces 80ds at the ends of the first end plate 24a and the second end plate 24b in the direction of arrow Af. The extension portions 104bL and 104bR are formed near an end of the lower sealing member 100d in the direction of arrow Ab and disposed on the flat surfaces 80ds at the ends of the first end plate 24a and the second end plate 24b in the direction of arrow Ab.

Bolt holes 84 are formed in the upper plate 76 and the lower plate 78. When the bolts 86 are inserted into the holes 84 and screwed into the tapped holes 70, the components of the stack case 18 are fixed to each other and fixed to the first end plate 24a and the second end plate 24b.

An operation of the fuel cell system 10, having the structure described above, will be described.

Referring to FIGS. 2 and 3, an oxidant gas, such as an oxygen-containing gas, is supplied from the oxidant gas inlet manifold member 60a on the first end plate 24a to the oxidant gas supply manifold 38a. A fuel gas, such as a hydrogen-containing gas, is supplied from the fuel gas inlet manifold member 62a on the first end plate 24a to the fuel gas supply manifold 40a.

Referring to FIG. 1, a coolant, such as pure water, ethylene glycol, or oil, is supplied from the coolant inlet manifold member 63a on the second end plate 24b to the pair of coolant supply manifolds 42a.

Referring to FIG. 4, the oxidant gas flows from the oxidant gas supply manifold 38a into the oxidant gas channel 50 of the cathode separator 34. The oxidant gas flows along the oxidant gas channel 50 in the direction of arrow A, and is supplied to the cathode electrode 46 of the membrane electrode assembly 32.

The fuel gas is supplied from the fuel gas supply manifold 40a to the fuel gas channel 52 of the anode separator 36. The fuel gas flows along the fuel gas channel 52 in the direction of arrow A, and is supplied to the anode electrode 48 of the membrane electrode assembly 32.

In the membrane electrode assembly 32, the oxidant gas supplied to the cathode electrode 46 and the fuel gas supplied to the anode electrode 48 are consumed in electrochemical reactions in the electrode catalyst layers, and thereby electric power is generated. The electric power generated by the fuel cell system 10 is used to drive the fuel cell electric automobile 12.

The oxidant gas supplied to the cathode electrode 46 of the membrane electrode assembly 32 and partially consumed is discharged along the oxidant gas discharge manifold 38b in the direction of arrow B. The fuel gas supplied to the anode electrode 48 of the membrane electrode assembly 32 and partially consumed is discharged along the fuel gas discharge manifold 40b in the direction of arrow B.

The coolant supplied to the pair of coolant supply manifolds 42a flows into the coolant channel 54 between the cathode separator 34 and the anode separator 36. The coolant temporarily flows inward in the direction of arrow C and cools the membrane electrode assembly 32 while flowing in the direction of arrow A. The coolant flows outward in the direction of arrow C and is discharged along the pair of coolant discharge manifolds 42b in the direction of arrow B.

In the present embodiment, referring to FIGS. 2 and 6, the extension portions 102fR, 102fL, 102bR, and 102bL for length adjustment are disposed at the corners of the upper sealing member 100u. Referring to FIG. 2, the extension portion 104fR, 104fL, 104bR, and 104bL for length adjustment are disposed at the corners of the lower sealing member 100d.

Therefore, even if an upper portion of the stack case 18 to be sealed have complex corner shapes, the extension portions 102fR, 102fL, 102bR, and 102bL can deform in accordance with the corner shapes. Moreover, even if a lower portion of the stack case 18 to be sealed have complex corner shapes, the extension portion 104fR, 104fL, 104bR, and 104bL can deform in accordance with the corner shapes.

Accordingly, the upper sealing member 100u and the lower sealing member 100d can be disposed air-tightly and liquid-tightly in accordance with various corner shapes. Therefore, an advantage is obtained in that the space between the fuel cell stack 16 and the stack case 18 can reliably and appropriately sealed with a simple structure.

Figure 7:
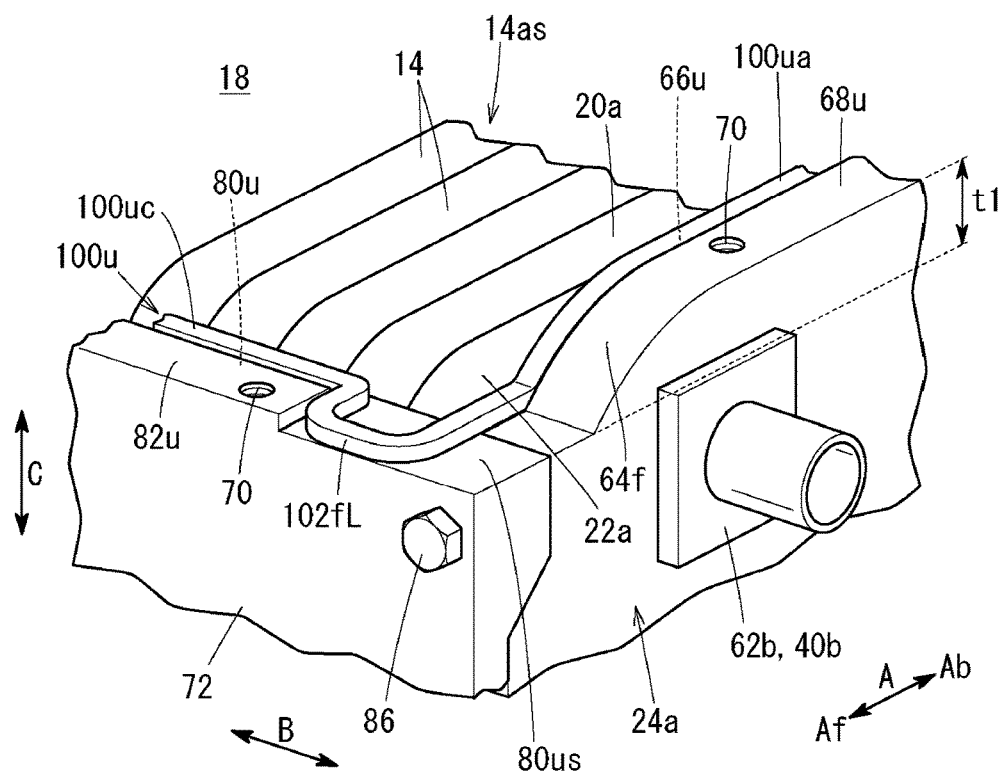
FIG. 7 is a partial enlarged perspective view of the stack case.

Moreover, referring to FIG. 2, the upper surfaces of the first end plate 24a and the second end plate 24b are located higher than the upper surface of the front side plate 72 by the distance t1. Referring to FIG. 7, the side 100uc of the upper sealing member 100u is disposed in the upper groove portion 80u of the front side plate 72, and the side 100ua of the upper sealing member 100u is disposed in the upper groove portion 66u of the first end plate 24a.

The side 100ua and the side 100uc of the upper sealing member 100u are disposed at different heights; and the extension portion 102fL, which is formed at a corner where the sides 100ua and 100uc join, is disposed on the flat surface 80us. Thus, the extension portion 102fL can smoothly move (deform) on the flat surface 80us due to the height difference between the sides 100ua and 100uc. Therefore, the extension portion 102fL can effectively perform a sealing function.

Furthermore, referring to FIG. 5, the left and right rounded portions R1 and R2 are formed near the end of the inner plate 90 in the direction of arrow Af, and the rounded portion R1 and the rounded portion R2 have different arc lengths. Therefore, the extension portions 102fL and 102fR of the upper sealing member 100u, which are disposed at the end of the inner plate 90 in the direction of arrow Af, can effectively perform length adjustment.

The lower sealing member 100d provides the same advantage as the upper sealing member 100u.

According to the present disclosure, a fuel cell system includes a fuel cell stack in which a plurality of power generation cells are stacked, each of the power generation cells generating electricity by causing electrochemical reactions between a fuel gas and an oxidant gas; and a stack case in which the fuel cell stack is accommodated.

The stack case includes a pair of end plates that are disposed at both ends of the fuel cell stack in a stacking direction in which the power generation cells are stacked. The stack case further includes a pair of side plates that are disposed along side surfaces of fuel cell stack, an upper plate that is disposed above the fuel cell stack, and a lower plate that is disposed below the fuel cell stack.

A rectangular-loop-shaped upper sealing member is disposed between the upper plate and the pair of end plates and between the upper plate and the pair of side plates. A rectangular-loop-shaped lower sealing member is disposed between the lower plate and the pair of end plates and between the lower plate and the pair of side plates. At least one of the upper sealing member and the lower sealing member includes an extension portion for length adjustment at at least one corner thereof.

In the fuel cell system, preferably, the extension portion has a curved shape that protrudes outward at the corner.

In the fuel cell system, preferably, the pair of end plates and the pair of side plates each include an upper groove portion, which accommodates the upper sealing member, and a lower groove portion, which accommodates the lower sealing member. In this case, preferably, the pair of end plates and the pair of side plates each include a protruding portion only on an outer peripheral side of each of the upper sealing member and the lower sealing member.

In the fuel cell system, preferably, two opposite sides of the upper sealing member are located at a height different from that of the other two sides of the upper sealing member that cross the two opposite sides, and two opposite sides of the lower sealing member are located at a height different from that of the other two sides of the lower sealing member that cross the two opposite sides.

With the present disclosure, at least one of the upper sealing member and the lower sealing member includes an extension portion for length adjustment at at least one corner thereof. Therefore, even if a portion of the stack case to be sealed has a complex corner shape, the extension portion for length adjustment can deform in accordance with the corner shape. Accordingly, the upper sealing member and/or the lower sealing member are/is disposed air-tightly and liquid-tightly in accordance with various corner shapes. Therefore, the space between the fuel cell stack and the stack case can be reliably and appropriately sealed with a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell stack in which a plurality of power generation cells are stacked, each of the power generation cells generating electricity by causing electrochemical reactions between a fuel gas and an oxidant gas; and
   a stack case in which the fuel cell stack is accommodated,
   wherein the stack case includes
      a pair of end plates that are disposed at both ends of the fuel cell stack in a stacking direction in which the power generation cells are stacked,
      a pair of side plates that are disposed along side surfaces of fuel cell stack,
      an upper plate that is disposed above the fuel cell stack, and
      a lower plate that is disposed below the fuel cell stack,
   wherein a loop-shaped upper sealing member is disposed between the upper plate and the pair of end plates and between the upper plate and the pair of side plates,
   wherein a loop-shaped lower sealing member is disposed between the lower plate and the pair of end plates and between the lower plate and the pair of side plates,
   wherein at least one of the upper sealing member or the lower sealing member includes rectangularly oriented sides and at least one corner having an extension portion for length adjustment, the extension portion extends outwardly from an outer perimeter of adjacent sides of the rectangularly oriented sides, and
   wherein the at least one of the upper sealing member or the lower sealing member has a constant cross-sectional shape from a first adjacent side of the adjacent sides through the extension portion to a second adjacent side of the adjacent sides.

2. The fuel cell system according to claim 1, wherein the extension portion has a curved shape that protrudes outward at the at least one corner.

3. The fuel cell system according to claim 1, wherein the pair of end plates and the pair of side plates each include an upper groove portion, which accommodates the upper sealing member, and a lower groove portion, which accommodates the lower sealing member, and
   wherein the pair of end plates and the pair of side plates each include a protruding portion only on an outer peripheral side of each of the upper sealing member and the lower sealing member.

4. The fuel cell system according to claim 1,
   wherein two opposite sides of the upper sealing member are located at a height different from that of the other two sides of the upper sealing member that cross the two opposite sides, and
   wherein two opposite sides of the lower sealing member are located at a height different from that of the other two sides of the lower sealing member that cross the two opposite sides.

5. The fuel cell system according to claim 1,
   wherein each end plate of the pair of end plates further includes a plurality of holes for receiving fasteners and a groove portion formed on an upper surface of each end plate of the pair of end plates inside of the plurality of holes,
   wherein each side plate of the pair of side plates further includes a plurality of holes for receiving fasteners, and
   wherein the upper sealing member and the lower sealing member are each located in the respective groove portion.

6. A fuel cell system comprising:
   a fuel cell stack comprising:
      power generation cells stacked in a stacking direction and configured to generate electricity via electrochemical reactions between a fuel gas and an oxidant gas;
      a first end and a second end opposite to the first end in the stacking direction;
      a first side and a second side opposite to the first side in a side direction perpendicular to the stacking direction; and
      a top side and a bottom side opposite to the top side in a height direction perpendicular to the stacking direction and the side direction;
   a stack case containing the fuel cell stack therein and comprising:
      a first end plate provided at the first end of the fuel cell stack;
      a second end plate provided at the second end of the fuel cell stack;
      a first side plate provided to be opposite to the first side of the fuel cell stack and connected to the first end plate and the second end plate;
      a second side plate provided to be opposite to the second side of the fuel cell stack and connected to the first end plate and the second end plate;
      a top cover plate provided to be opposite to the top side of the fuel cell stack and connected to the first end plate, the second end plate, the first side plate, and the second side plate;
      a bottom cover plate provided to be opposite to the bottom side of the fuel cell stack and connected to the first end plate, the second end plate, the first side plate, and the second side plate;
      a top sealing member having a frame shape and disposed between the top cover plate and each of the first end plate, the second end plate, the first side plate and the second side plate; and
      a bottom sealing member having a frame shape and disposed between the bottom cover plate and each of the first end plate, the second end plate, the first side plate and the second side plate, at least one of the top sealing member or the bottom sealing member including rectangularly oriented sides and at least one corner having an extension portion to adjust a peripheral length of the frame shape, the extension portion extends outwardly from an outer perimeter of adjacent sides of the rectangularly oriented sides, wherein the at least one of the top sealing member or the bottom sealing member has a constant cross-sectional shape from a first adjacent side of the adjacent sides through the extension portion to a second adjacent side of the adjacent sides.

7. The fuel cell system according to claim 6, wherein the extension portion has a curved shape protruding outward at the at least one corner.

8. The fuel cell system according to claim 6, wherein the first end plate, the second end plate, the first side plate, and the second side plate each include a first groove portion and a second groove portion, the first groove portion accommodating the top sealing member, the second groove portion accommodating the bottom sealing member, and wherein the first end plate, the second end plate, the first side plate, and the second side plate each include a protruding portion on an outer peripheral side of each of the top sealing member and the bottom sealing member.

9. The fuel cell system according to claim 6, wherein the top sealing member has first two opposite sides and second two opposite sides crossing the first two opposite sides, the first two opposite sides and the second two second opposite sides being located at different heights in the height direction, and wherein the bottom sealing member has third two opposite sides and fourth two opposite sides crossing the third two opposite sides, the third two opposite sides and the fourth two opposite sides being located at different heights in the height direction.

10. The fuel cell system according to claim 6, wherein the adjacent sides of the rectangularly oriented sides include:

a first straight side extending along an edge of one of the first end plate and the second end plate in the side direction; and a second straight side extending along an edge of one of the first side plate and the second side plate in the stacking direction, and wherein the extension portion extends outwardly from the second straight side in the side direction.

11. The fuel cell system according to claim 10, wherein the extension portion extends outwardly from the first straight side in the stacking direction.

12. A fuel cell system comprising:

a fuel cell stack in which a plurality of power generation cells are stacked, each of the power generation cells generating electricity by causing electrochemical reactions between a fuel gas and an oxidant gas; and a stack case in which the fuel cell stack is accommodated, wherein the stack case includes a pair of end plates that are disposed at both ends of the fuel cell stack in a stacking direction in which the power generation cells are stacked, a pair of side plates that are disposed along side surfaces of fuel cell stack, an upper plate that is disposed above the fuel cell stack, and a lower plate that is disposed below the fuel cell stack, wherein a loop-shaped upper sealing member is disposed between the upper plate and the pair of end plates and between the upper plate and the pair of side plates, wherein a loop-shaped lower sealing member is disposed between the lower plate and the pair of end plates and between the lower plate and the pair of side plates, and wherein at least one of the upper sealing member or the lower sealing member includes rectangularly oriented sides and at least one corner having an extension portion for length adjustment, the extension portion extends outwardly from an outer perimeter of adjacent sides of the rectangularly oriented sides, wherein the adjacent sides of the rectangularly oriented sides include:

a first straight side extending along an edge of one of the pair of end plates in a side direction perpendicular to the stacking direction; and a second straight side extending along an edge of one of the pair of side plates in the stacking direction, wherein the extension portion extends outwardly from the second straight side in the side direction, and wherein the extension portion does not extend outwardly from the first straight side in the stacking direction.

13. The fuel cell system according to claim 12, wherein the extension portion extends outwardly from the first straight side in the stacking direction.

* * * * *